(12) United States Patent
Williams et al.

(10) Patent No.: US 10,377,380 B2
(45) Date of Patent: Aug. 13, 2019

(54) VEHICLE SAFETY SYSTEM

(71) Applicants: Denso International America, Inc., Southfield, MI (US); DENSO CORPORATION, Kariya-shi, Aichi-ken (JP)

(72) Inventors: Matthew Williams, Royal Oak, MI (US); Miki Sato, Novi, MI (US)

(73) Assignees: DENSO International America, Inc., Southfield, MI (US); DENSO CORPORATION, Kariya, Aichi (JP)

( * ) Notice: Subject to any disclaimer, the term of this patent is extended or adjusted under 35 U.S.C. 154(b) by 0 days.

(21) Appl. No.: 15/401,784

(22) Filed: Jan. 9, 2017

(65) Prior Publication Data

US 2018/0194350 A1 Jul. 12, 2018

(51) Int. Cl.
| | |
|---|---|
| *B60W 30/00* | (2006.01) |
| *B60W 30/14* | (2006.01) |
| *B60W 10/06* | (2006.01) |
| *B60W 10/18* | (2012.01) |
| *G08G 1/16* | (2006.01) |
| *G01S 15/93* | (2006.01) |
| *G01S 17/58* | (2006.01) |
| *G01S 17/93* | (2006.01) |
| *G01S 13/93* | (2006.01) |

(52) U.S. Cl.
CPC ......... *B60W 30/143* (2013.01); *B60W 10/06* (2013.01); *B60W 10/18* (2013.01); *G01S 15/931* (2013.01); *G01S 17/58* (2013.01); *G01S 17/936* (2013.01); *G08G 1/167* (2013.01); *B60W 2420/42* (2013.01); *B60W 2420/52* (2013.01); *B60W 2420/54* (2013.01); *B60W 2510/18* (2013.01); *B60W 2550/141* (2013.01); *B60W 2710/18* (2013.01); *B60W 2750/30* (2013.01); *G01S 2013/9321* (2013.01); *G01S 2013/9332* (2013.01); *G01S 2013/9364* (2013.01); *G01S 2013/9367* (2013.01)

(58) Field of Classification Search
None
See application file for complete search history.

(56) References Cited

U.S. PATENT DOCUMENTS

| | | | |
|---|---|---|---|
| 7,552,012 B2 | 6/2009 | Lehner | |
| 7,852,462 B2 | 12/2010 | Breed et al. | |
| 8,589,014 B2 | 11/2013 | Fairfield et al. | |
| 2008/0169938 A1* | 7/2008 | Madau | B60R 1/00 340/901 |
| 2015/0356869 A1* | 12/2015 | Young | G08G 1/0133 340/901 |
| 2017/0101096 A1* | 4/2017 | Kim | B60W 30/16 |

* cited by examiner

*Primary Examiner* — James M McPherson
(74) *Attorney, Agent, or Firm* — Harness, Dickey & Pierce, P.L.C.

(57) ABSTRACT

A blind spot safety system for a subject vehicle. The safety system includes a blind spot monitoring module that detects when a secondary vehicle is operating in a blind spot of the subject vehicle. A vehicle control module controls speed of the subject vehicle. When the blind spot monitoring module detects that the secondary vehicle is operating in the blind spot of the subject vehicle, the blind spot monitoring module instructs the vehicle control module to increase or decrease speed of the subject vehicle to move the subject vehicle relative to the secondary vehicle such that the secondary vehicle is not in the blind spot of the subject vehicle.

16 Claims, 3 Drawing Sheets

VEHICLE SAFETY SYSTEM

FIELD

The present disclosure relates to a vehicle safety system, such as a system that moves a subject vehicle relative to a secondary vehicle when the secondary vehicle is driving in a blind spot of the subject vehicle.

BACKGROUND

This section provides background information related to the present disclosure, which is not necessarily prior art.

Various systems exist for informing a driver of a subject vehicle that there is a secondary vehicle in the driver's blind spot. While current blind spot safety systems are suitable for their intended use, they are subject to improvement. The present teachings provide an improved blind spot safety system that provides numerous advantages over current systems, as explained in detail herein and as one skilled in the art will appreciate.

SUMMARY

This section provides a general summary of the disclosure, and is not a comprehensive disclosure of its full scope or all of its features.

The present teachings include a blind spot safety system for a subject vehicle. The safety system includes a blind spot monitoring module that detects when a secondary vehicle is operating in a blind spot of the subject vehicle. A vehicle control module controls speed of the subject vehicle. When the blind spot monitoring module detects that the secondary vehicle is operating in the blind spot of the subject vehicle, the blind spot monitoring module instructs the vehicle control module to increase or decrease speed of the subject vehicle to move the subject vehicle relative to the secondary vehicle such that the secondary vehicle is not in the blind spot of the subject vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2A:
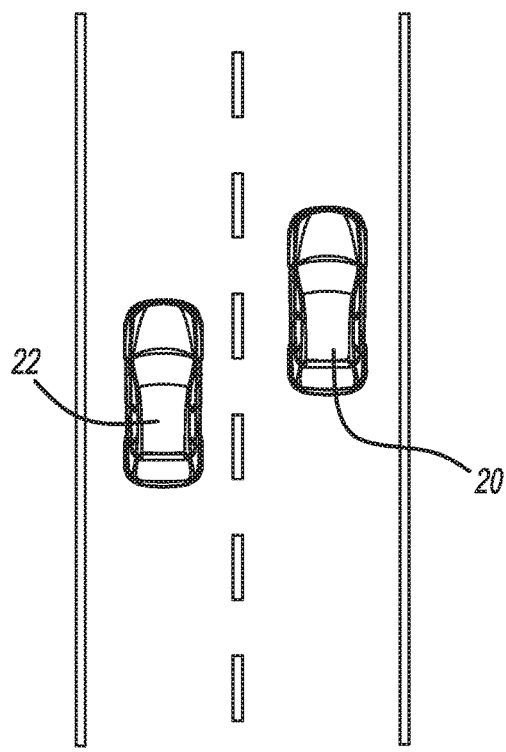
FIG. 2A illustrates a secondary vehicle driving in a blind spot of a subject vehicle including the blind spot safety system according to the present teachings.
Figure 2B:
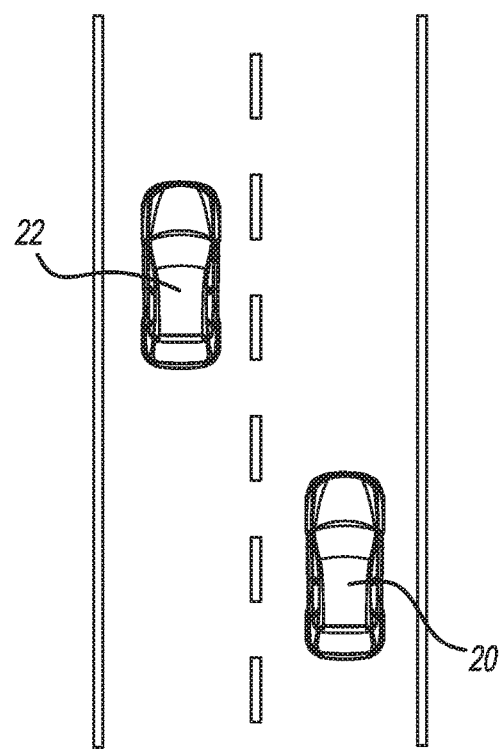
Figure 3:
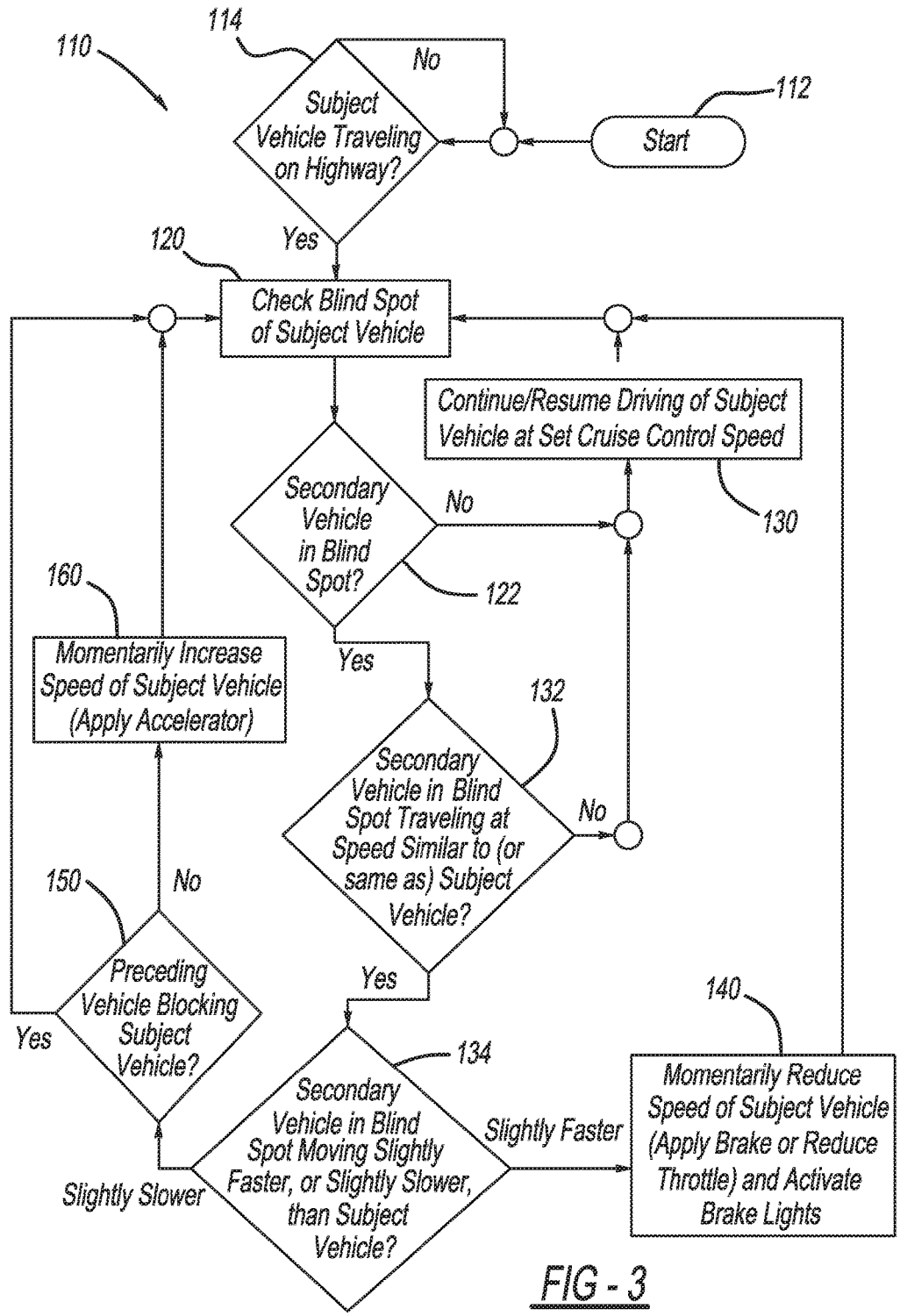

FIG. 2B illustrates the subject vehicle after the speed thereof has been reduced by the blind spot safety system according to the present teachings so that the secondary vehicle is no longer in the blind spot of the subject vehicle; and FIG. 3 illustrates a method according to the present teachings for changing the subject vehicle's position relative to the secondary vehicle when the secondary vehicle is in the blind spot of the subject vehicle.

Corresponding reference numerals indicate corresponding parts throughout the several views of the drawings.

DETAILED DESCRIPTION

Example embodiments will now be described more fully with reference to the accompanying drawings.

Figure 1:
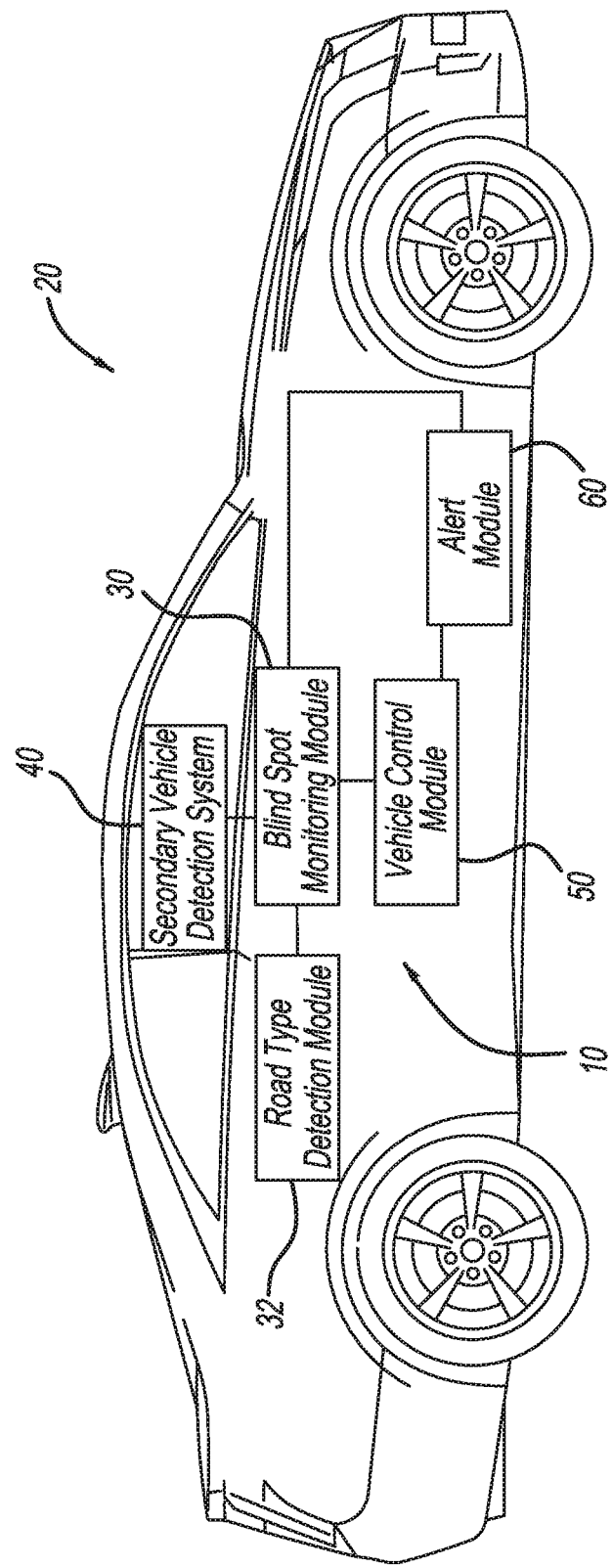
FIG. 1 illustrates a blind spot safety system according to the present teachings included in an exemplary subject vehicle.

FIG. 1 illustrates a blind spot safety system 10 according to the present teachings included with an exemplary subject vehicle 20. The subject vehicle 20 is illustrated as a passenger vehicle for exemplary purposes only. The present teachings are applicable to any suitable vehicle. For example, the blind spot safety system 10 (and the method 110 of FIG. 3) can be included with (installed in) any suitable passenger vehicle, utility vehicle, mass transit vehicle, commercial vehicle, recreational vehicle, construction equipment, military vehicle, etc.

In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The blind spot safety system 10 includes a blind spot monitoring module 30. The blind spot monitoring module 30 is configured to monitor blindspots of the subject vehicle 20 and detect when a secondary vehicle is in a blind spot of the subject vehicle 20 (at low relative speed to the subject vehicle 20, for example). With reference to FIG. 2A, for example, an exemplary secondary vehicle 22 is illustrated as traveling in a blind spot of the subject vehicle 20. The blind spot monitoring module 30 can detect a secondary vehicle in the blind spots in any suitable manner. For example, the blind spot safety system 10 includes a secondary vehicle detection system 40, which is configured to detect one or more secondary vehicles 22 proximate to the subject vehicle 20, and the speed of each one of the detected secondary vehicles 22. The secondary vehicle detection system 40 can include any equipment suitable to detect the location of secondary vehicles 22 and the speed thereof, such as any suitable radar, sonar, and/or LIDAR equipment. The secondary vehicle detection system 40 inputs the position and speed data of any detected secondary vehicle 22 to the blind spot monitoring module 30.

The blind spot monitoring module 30 compares the locations of secondary vehicles 22 to the locations of the blind spots of the subject vehicle 20 to determine if there is a secondary vehicle 22 in a blind spot of the subject vehicle 20. When the blind spot monitoring module 30 determines that a secondary vehicle 22 is in a blind spot of the subject vehicle 20, the blind spot monitoring module 30 retrieves the speed of the subject vehicle 20 from a vehicle control module 50, as well as whether or not a cruise control system of the subject vehicle 20 is activated.

The system 10 further includes a road-type detection module 32, which detects the type of road that the subject vehicle 20 is traveling on in any suitable manner. For example, the road-type detection module 32 can receive inputs from cameras or other sensors mounted to the subject vehicle 20, which are configured to gather data regarding the road, such as the number of lanes that the road has and whether or not the road has stop signs or traffic lights. The road-type detection module 32 determines that the subject vehicle 20 is traveling on a highway when inputs to the road-type detection module 32 indicate that the road is a multilane road with no stop signs or traffic signals requiring the subject vehicle 20 to stop, for example. The road-type detection module 32 may also receive transmissions from roadside equipment identifying the type of road that the subject vehicle 20 is traveling on. The blind spot monitoring module 30 can be configured to only detect whether a secondary vehicle 22 is in a blind spot of the subject vehicle 20 when the road-type detection module 32 informs the blind spot monitoring module 30 that the subject vehicle 20 is traveling on a highway. In some applications, however, the blind spot monitoring module 30 can be configured to detect secondary vehicles 22 in a blind spot of the subject vehicle 20 regardless of the type of road that the subject vehicle 20 is traveling on.

The system 10 further includes the vehicle control module 50. The vehicle control module 50 is configured to determine the speed of the subject vehicle 20, as well as whether the cruise control of the subject vehicle 20 has been activated. The vehicle control module 50 is further configured to control the speed of the subject vehicle 20, such as by controlling braking and acceleration of the subject vehicle 20. The vehicle control module 50 is in communication with the blind spot monitoring module 30. Thus the vehicle control module 50 can input the speed and cruise control settings of the subject vehicle 20 to the blind spot monitoring module 30, and can control the speed of the subject vehicle 20 in response to commands received from the blind spot monitoring module 30.

When the blind spot monitoring module 30 determines that a secondary vehicle 22 is in a blind spot of the vehicle 20, such as based on data collected by the secondary vehicle detection system 40, the blind spot monitoring module 30 compares the speed of the secondary vehicle 22 to the speed of the subject vehicle 20. If the secondary vehicle 22 traveling in the blind spot of the subject vehicle 20 is traveling at a speed that is similar to, or the same as, the speed of the subject vehicle 20 (such as within about 0-4 mph plus or minus, such as 1 mph plus or minus) of the speed of the subject vehicle 20, the blind spot monitoring module 30 compares the speed of the secondary vehicle 22 to the speed of the subject vehicle 20. If the secondary vehicle 22 is not traveling at a speed similar to (or the same as) the subject vehicle 20 and is thus traveling at a speed substantially faster or slower than the subject vehicle 20 (such as at a speed differential of greater than 4 mph plus or minus), then the blind spot monitoring module 30 will not command the vehicle control module 50 to alter the speed of the subject vehicle.

If the blind spot monitoring module detects that the secondary vehicle 22 is traveling at a speed only slightly greater than the speed of the subject vehicle 20, such as 1-4 mph (specifically 1 mph for example) greater than the subject vehicle 20, the blind spot monitoring module 30 will command the vehicle control module 50 to momentarily reduce the speed of the subject vehicle 20 so as to allow the secondary vehicle 22 to move ahead of the subject vehicle 20 and no longer be in the blind spot of the subject vehicle 20, as illustrated in FIG. 2B for example. The vehicle control module 50 is configured to reduce the speed of the subject vehicle 20 in any suitable manner, such as by activating the brakes of the subject vehicle 20 and/or reducing the engine speed of the subject vehicle 20 by closing the throttle. The vehicle control module 50 activates the brake lights of the subject vehicle 20 when the speed thereof is reduced to notify surrounding vehicles.

If the blind spot monitoring module 30 detects that the secondary vehicle 22 in the blind spot of the subject vehicle 20 is traveling at a speed that is slightly slower than the speed of the subject vehicle 20, such as 1-4 mph (specifically 1 mph for example) slower, the blind spot monitoring module 30 will command the vehicle control module 50 to momentarily increase the speed of the subject vehicle 20 to allow the subject vehicle 20 to move ahead of the secondary vehicle 22 so that the secondary vehicle 22 is no longer in the blind spot of the subject vehicle 20. The vehicle control module 50 is configured to increase the speed of the subject vehicle 20 in any suitable manner, such as by applying the accelerator and/or opening the throttle. The blind spot monitoring module 30 will only increase the speed of the subject vehicle 20 when the secondary vehicle detection system 40 determines that there are no other vehicles directly in front of the subject vehicle 20. If the blind spot monitoring module 30 detects that the secondary vehicle 22 in the blind spot of the subject vehicle 20 is traveling at the same speed as the subject vehicle 20, the blind spot monitoring module 30 can be configured to either increase the speed of the subject vehicle 20, or decrease the speed of the subject vehicle 20 (such as when another vehicle is detected in front of the subject vehicle 20).

The system 10 further includes an alert module 60. The alert module 60 can include any suitable audible and/or visual alerts suitable to notify the driver of the subject vehicle 20 that there is a secondary vehicle 22 in the blind spot of the subject vehicle 20. For example, the alert module 60 can include a visual alert (such as on a heads-up-display or instrument panel of the subject vehicle 20), or an audible alert with voice notifications. The alert module 60 is configured to alert the driver of the subject vehicle 20 when a secondary vehicle 22 is in the blind spot of the subject vehicle 20, as well as the particular location of the secondary vehicle 22. The alert module 60 is further configured to alert the driver of the subject vehicle 20 whether the blind spot monitoring module 30 is commanding the vehicle control module 50 to speed up, or slow down, the subject vehicle 20. The subject vehicle 20 can include a manual override allowing the driver of the subject vehicle 20 to override the command to speed up, or slow down, the subject vehicle 20.

FIG. 3 illustrates an exemplary method according to the present teachings for changing a subject vehicle's position relative to a secondary vehicle when the secondary vehicle is in a blind spot of the subject vehicle. The method 110 can be performed with the blind spot safety system 10, or with any other suitable system or device. The following description of the method 110 describes the method 110 being performed by the blind spot safety system 10 for exemplary purposes only.

The method 110 starts at block 112 and proceeds to block 114, where it is determined whether or not the subject vehicle 20 is traveling on a highway. The type of road that the subject vehicle 20 is traveling on can be determined by the road-type detection module 32 as described above, or in any other suitable manner. If it is determined that the subject vehicle 20 is not traveling on a highway, the method 110 will continue to monitor the type of road that the subject vehicle 20 is traveling upon, and the method 110 will not proceed further unless the subject vehicle 20 is traveling on a highway. In some applications, the method 110 can be configured to proceed regardless of the type of road that the subject vehicle 20 is traveling upon.

From block 114, the method 110 proceeds to blocks 120 and 122. At blocks 120 and 122 the blind spots of the subject vehicle 20 are checked to determine whether or not a secondary vehicle is traveling in the blind spots. The blind spots of the subject vehicle can be checked in any suitable manner, such as with the blind spot monitoring module 30 based on data gathered by the secondary vehicle detection system 40. If no secondary vehicle is present in a blind spot of the subject vehicle 20, the method 110 proceeds from block 122 to block 130. At block 130, the subject vehicle 120 is allowed to proceed at its current speed, such as at the set cruise control speed. From block 130, the method 110 returns to block 120 where the blind spots of the subject vehicle 20 are checked. If at block 122 it is determined that a secondary vehicle 22 is within a blind spot of the subject vehicle 20, such as by the blind spot monitoring module 30, the method 110 proceeds from block 122 to block 132.

At block 132 the speed of the secondary vehicle 22 in the blind spot of the subject vehicle 20 is determined, such as by the secondary vehicle detection system 40, for example. If the secondary vehicle 22 in the blind spot of the subject vehicle 20 is traveling at a speed that is not similar to the speed of the subject vehicle 20, such as at a speed that is not within 0-4 mph plus or minus (specifically 1 mph plus or minus for example) of the subject vehicle 20, the method 110 proceeds from block 132 back to block 130, because due to the relatively large speed differential, the secondary vehicle 22 will likely not be within the blind spot of the subject vehicle 20 for an unsafe period of time. If at block 132 it is determined that the secondary vehicle is traveling within 0-4 mph plus or minus (specifically 1 mph plus or minus for example) of the speed of the subject vehicle (including the same speed as the subject vehicle 20), the method 110 proceeds to block 134.

At block 134, the method 110 determines whether the secondary vehicle 22 in the blind spot of the subject vehicle 20 is traveling at a speed slightly faster than, or slightly slower than, the subject vehicle 20. If at block 134 it is determined that the secondary vehicle 22 is traveling at a speed that is slightly faster than the speed of the subject vehicle 20, such as about 1-4 mph faster (specifically 1 mph faster), then the method proceeds to block 140. At block 140 the speed of the subject vehicle 20 is temporarily reduced in order to allow the secondary vehicle 22 to pass the subject vehicle 20 such that the secondary vehicle 22 is no longer in the blind spot of the subject vehicle 20. The speed of the subject vehicle 20 can be reduced in any suitable manner, such as by applying the brakes of the subject vehicle 20 and/or reducing the engine speed of the subject vehicle 20, which can be performed by the vehicle control module 50 in response to a command from the blind spot monitoring module 30, or in any other suitable manner. From block 140 the method 110 returns to block 120.

If at block 134 it is determined that the secondary vehicle 22 in the blind spot of the subject vehicle 20 is traveling at a speed slightly slower, such as 1-4 mph slower (specifically 1 mph slower), than the speed of the subject vehicle 20, the method 110 proceeds to block 150. At block 150, it is determined whether a preceding vehicle in front of the subject vehicle 20 is blocking safe advancement of the subject vehicle 20, such as by using the secondary vehicle detection system 40 as described above, or in any other suitable manner. If at block 150 it is determined that the preceding vehicle is blocking the subject vehicle 20, the method returns to block 120. If at block 150 it is determined that there is no preceding vehicle that would hamper safe acceleration of the subject vehicle 20, the method 110 proceeds to block 160 where the speed of the subject vehicle 20 is momentarily increased in any suitable manner. For example, the blind spot monitoring module 30 can command the vehicle control module 50 to momentarily increase the speed of the subject vehicle 20 as described above so that the subject vehicle 20 moves further ahead of the secondary vehicle 22, and thus the secondary vehicle 22 will no longer be traveling in the blind spot of the subject vehicle 20. From block 160 the method 110 returns to block 120. If it is determined that the subject vehicle 20 and the secondary vehicle 22 traveling in the blind spot thereof are traveling at the same speed, then the method 110 can proceed to either block 140 or block 150.

The present teachings thus advantageously provide for a blind spot safety system and method that not only detect when a secondary vehicle 22 is in a blind spot of a subject vehicle 20, but also increase or decrease the speed of the subject vehicle 20 as appropriate so that the secondary vehicle 22 will no longer be traveling in the blind spot of the subject vehicle 20. This advantageously provides safer driver conditions for both the subject vehicle 20 and secondary vehicles 22 proximate to the subject vehicle 20. One skilled in the art will recognize that the present teachings provide numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A blind spot safety system for a subject vehicle comprising:
   a blind spot monitoring module that detects when a secondary vehicle is operating in a blind spot of the subject vehicle;
   a vehicle control module that controls speed of the subject vehicle; and
   a road-type detection module that detects a road type of a road that the subject vehicle is traveling on by detecting at least one of the following: number of lanes of the road, whether the road has stop signs, and whether the road has traffic lights;
   wherein the road-type detection module activates the blind spot monitoring module when the road-type detection module detects that the subject vehicle is traveling on a highway and traveling above a predetermined threshold speed;
   wherein the road-type detection module deactivates, or does not activate, the blind spot monitoring module when the road-type detection module detects that the subject vehicle is not traveling on a highway, or traveling on a highway below the predetermined threshold speed;
   wherein when the blind spot monitoring module detects that the secondary vehicle is operating in the blind spot of the subject vehicle, the blind spot monitoring module instructs the vehicle control module to increase or decrease speed of the subject vehicle from a set cruise control speed as long as the blind spot monitoring module detects the secondary vehicle in the blind spot to move the subject vehicle relative to the secondary vehicle such that the secondary vehicle is not in the blind spot of the subject vehicle, and the vehicle control module returns the speed of the vehicle to the set cruise control speed when the blind spot monitoring module no longer detects the secondary vehicle in the blind spot; and
   wherein the blind spot monitoring module detects when the secondary vehicle is operating in the blind spot of the subject vehicle, and speed of the secondary vehicle, with a secondary vehicle detection system including at least one of radar, sonar, and LIDAR.

2. The blind spot safety system of claim 1, wherein the vehicle control module controls speed of the subject vehicle by controlling at least one of brakes and engine speed of the subject vehicle.

3. The blind spot safety system of claim 1, wherein when the blind spot monitoring module detects that the secondary vehicle is operating in the blind spot of the subject vehicle, the blind spot monitoring module instructs the vehicle control module to increase or decrease the speed of the subject vehicle from a set cruise control speed to move the subject vehicle such that the secondary vehicle is no longer in the blind spot of the subject vehicle.

4. The blind spot safety system of claim 1, wherein the blind spot monitoring module instructs the vehicle control module to increase or decrease the speed of the subject vehicle from the set cruise control speed only when speed of the secondary vehicle is substantially similar to speed of the subject vehicle.

5. The blind spot safety system of claim 1, wherein the blind spot monitoring module instructs the vehicle control module to increase or decrease the speed of the subject vehicle from the set cruise control speed only when speed of the secondary vehicle is the same as, or within about 1-4 mph of the speed of the subject vehicle.

6. The blind spot safety system of claim 1, wherein the blind spot monitoring module instructs the vehicle control module to reduce a speed of the subject vehicle from the set cruise control speed when the speed of the secondary vehicle is greater than the set cruise control speed.

7. The blind spot safety system of claim 1, wherein the blind spot monitoring module instructs the vehicle control module to increase the speed of the subject vehicle from the set cruise control speed when the speed of the secondary vehicle is not greater than the set cruise control speed.

8. The blind spot safety system of claim 1, wherein the blind spot monitoring module instructs the vehicle control module to increase the speed of the subject vehicle from the set cruise control speed when the speed of the secondary vehicle is not greater than the set cruise control speed.

9. A method for changing a subject vehicle's position relative to a secondary vehicle when the secondary vehicle is in a blind spot of the subject vehicle, the method comprising:
- detecting, with a road-type detection module, a road-type of a road that the subject vehicle is traveling on by detecting at least one of the following: number of lanes of the road, whether the road has stop signs, and whether the road has traffic lights;
- when the road-type detection module detects that the subject vehicle is traveling on a highway and traveling above a pre-determined threshold speed, the road-type detection module activates a blind spot monitoring module that detects when the secondary vehicle is operating in a blind spot of the subject vehicle;
- when the road-type detection module detects that the subject vehicle is not traveling on a highway, or traveling on a highway below the predetermined threshold speed, the road-type detection module deactivates, or does not activate, the blind spot monitoring module;
- when the blind spot monitoring module detects that the secondary vehicle is operating in the blind spot of the subject vehicle, the blind spot monitoring module instructs a vehicle control module to increase or decrease speed of the subject vehicle from a set cruise control speed to move the subject vehicle relative to the secondary vehicle so that the secondary vehicle is not in the blind spot of the subject vehicle; and
- the vehicle control module returns the speed of the subject vehicle to the set cruise control speed when the blind spot monitoring module no longer detects the secondary vehicle in the blind spot;
- wherein the blind spot monitoring module detects when the secondary vehicle is operating in the blind spot of the subject vehicle, and speed of the secondary vehicle, with a secondary vehicle detection system including at least one of radar, sonar, and LIDAR.

10. The method of claim 9, further comprising increasing or decreasing speed of the subject vehicle by controlling at least one of brakes and engine speed of the subject vehicle.

11. The method of claim 9, further comprising increasing or decreasing speed of the subject vehicle from the set cruise control speed to move the subject vehicle relative to the secondary vehicle such that the secondary vehicle is not in the blind spot of the subject vehicle.

12. The method of claim 9, further comprising increasing or decreasing speed of the subject vehicle from the set cruise control speed to move the subject vehicle relative to the secondary vehicle such that the secondary vehicle is not in the blind spot of the subject vehicle only when speed of the secondary vehicle is substantially similar to speed of the subject vehicle.

13. The method of claim 9, further comprising increasing or decreasing speed of the subject vehicle from the set cruise control speed to move the subject vehicle relative to the secondary vehicle such that the secondary vehicle is not in the blind spot of the subject vehicle only when speed of the secondary vehicle is the same as, or within about 1-4 mph of the subject vehicle.

14. The method of claim 9, further comprising reducing the speed of the subject vehicle from the set cruise control speed when a speed of the secondary vehicle is greater than the set cruise control speed.

15. The method of claim 9, further comprising increasing the speed of the subject vehicle from the set cruise control speed when the speed of the secondary vehicle is not greater than the set cruise control speed.

16. The method of claim 9, further comprising increasing the speed of the subject vehicle from the set cruise control speed when the speed of the secondary vehicle is not greater than the set cruise control speed.

* * * * *

UNITED STATES PATENT AND TRADEMARK OFFICE
CERTIFICATE OF CORRECTION

PATENT NO. : 10,377,380 B2
APPLICATION NO. : 15/401784
DATED : August 13, 2019
INVENTOR(S) : Matthew Williams et al.

It is certified that error appears in the above-identified patent and that said Letters Patent is hereby corrected as shown below:

On the Title Page

Column 1, (73) Assignees, Line 3: Delete "Aichi" and insert --Aichi-pref.-- therefor Signed and Sealed this
Twenty-fifth Day of February, 2020

Andrei Iancu
*Director of the United States Patent and Trademark Office*